United States Patent [19]

Garves

[11] 4,415,137

[45] Nov. 15, 1983

[54] CANTILEVER ATTACHMENT

[76] Inventor: John C. Garves, 10 Post Office Rd., Silver Spring, Md. 20910

[21] Appl. No.: 364,591

[22] Filed: Apr. 2, 1982

[51] Int. Cl.³ .............................................. F16M 13/00
[52] U.S. Cl. ................................ 248/629; 248/205 R; 47/67; 211/86
[58] Field of Search .................. 248/629, 205.1, 205.4, 248/206.1, 125, 245, 246; 211/107; 47/67; 211/86; 108/148, 152

[56] References Cited

U.S. PATENT DOCUMENTS

| | | | |
|---|---|---|---|
| 2,774,562 | 12/1956 | Henry | 248/246 X |
| 2,801,851 | 8/1957 | Meek | 248/246 X |
| 2,978,218 | 4/1961 | Featheringham | 248/205.1 |
| 4,117,629 | 10/1978 | Ekdahl | 248/214 X |

Primary Examiner—William E. Lyddane
Assistant Examiner—Sarah A. Lechok
Attorney, Agent, or Firm—James C. Wray

[57] ABSTRACT

Cantilever attachment method and apparatus are described. A resilient portion of a cantilever assembly holds a first part of an attachment device. The second part of the attachment device is positioned on a side of a post opposite the cantilever assembly. The attachment to the resilient means is positioned opposite an intermediate portion of a base on the cantilever assembly. The base lies against the post when assembled. The cantilever assembly is first tipped upward and the attachment is joined to the resilient portion. Tipping the cantilever assembly downward compresses the resilient portion. Continued rotation of the cantilever assembly downward slightly raises the cantilever assembly along the post and slightly relaxes the compression of the resilient portion, thereby creating an over-the-center clamp. The cantilever assembly, the base and the resilient portion are made of a single strip of rolled steel, curved upward on a distal end to suspend a hanging object, extended inward and then downward to form the resilient means, which provides the over-the-center clamping and the holding of the base against the post.

Cams are provided on the attachment means on a side of the post opposite the base to adjust the resilient force with which the base is held against the post and to provide versatility so that the device may be used with posts of different thicknesses.

22 Claims, 8 Drawing Figures

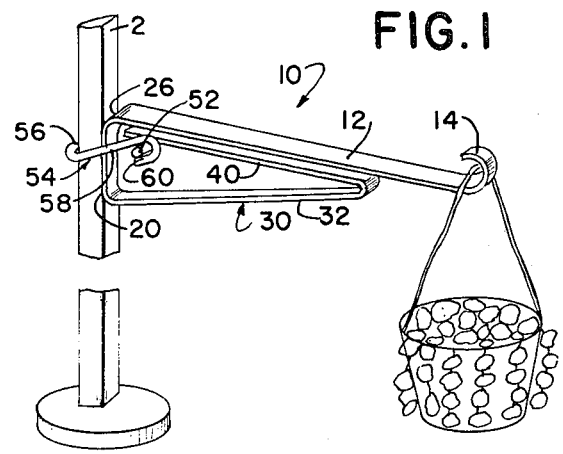
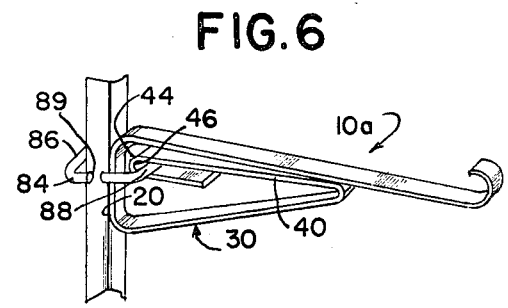
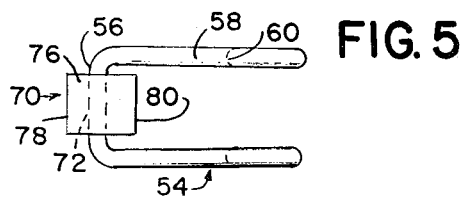
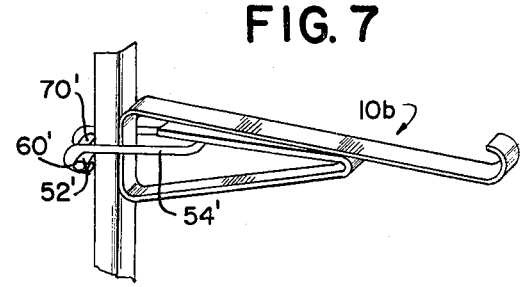
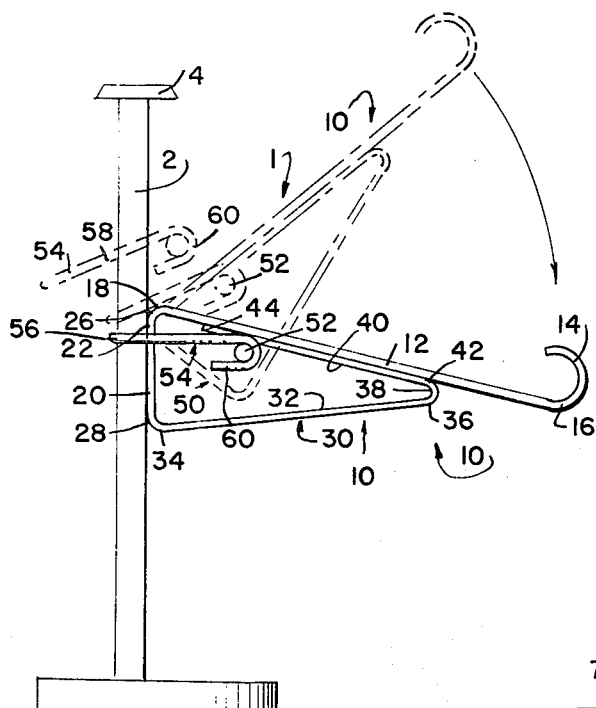
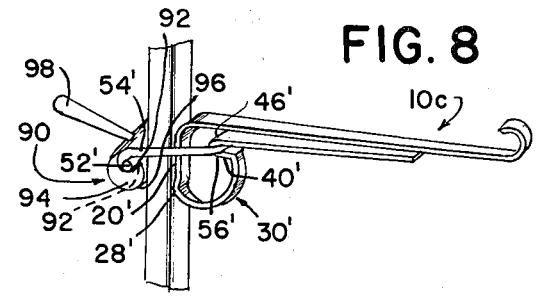
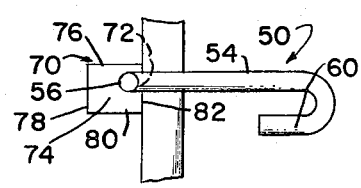
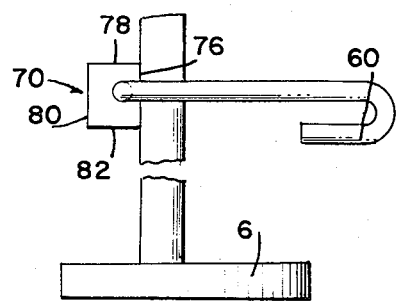

CANTILEVER ATTACHMENT

BACKGROUND OF THE INVENTION

The invention relates to supports and attachments for hanging objects suspended on cantilevers from posts, particularly iron posts such as the posts which support railings around apartment balconies.

Related supports and brackets are found in the U.S. Patent and Trademark Office, particularly in Class 47, Plant Husbandry, subclass 67, Plant Hanging Supports; Class 211, Supports and Racks, especially subclass 107, Column Supports; and Class 248, Supports, particularly subclass 205, Especially Mounted or Attached Brackets.

In U.S. Pat. No. 4,117,629 a pot-holding arm is removably secured to a semi-circular receiving member in one of several retaining pockets and cooperating slots.

In U.S. Pat. No. 2,978,218 a connecting spring clip (12 in FIG. 5) is used with a hanging arm and wall bracket.

In U.S. Pat. No. 2,506,119 a bracket employs an attaching plate which is a single piece of sheet metal.

U.S. Pat. No. 3,477,677 has a catch for perforated boards.

U.S. Pat. No. 961,319 shows a bracket for use on generally circular columns or posts.

U.S. Pat. No. 4,098,483 shows a swivel plant hanger with an elongated member bent downward at both ends.

U.S. Pat. No. 3,341,163 shows a lantern hanger.

U.S. Pat. No. 3,199,820 shows a support for hanging objects.

U.S. Pat. No. 267,459 describes a picture hook which abuts a wall.

U.S. Pat. No. 2,990,642 shows an attachment for a swingable arm.

A need persists for a cantilever attachment which can be readily connected and disconnected with a vertical post and which once placed in use remains suitably positioned.

SUMMARY OF THE INVENTION

Cantilever attachment method and apparatus are described. A resilient portion of a cantilever assembly holds a first part of an attachment device. The second part of the attachment device is positioned on a side of a post opposite the cantilever assembly. The attachment to the resilient means is positioned opposite an intermediate portion of a base on the cantilever assembly. The base lies against the post when assembled. The cantilever assembly is first tipped upward and the attachment is joined to the resilient portion. Tipping the cantilever assembly downward compresses the resilient portion. Continued rotation of the cantilever assembly downward slightly raises the cantilever assembly along the post and slightly relaxes the compression of the resilient portion, thereby creating an over-the-center clamp. The cantilever assembly, the base and the resilient portion are made of a single strip of rolled steel, curved upward on a distal end to suspend a hanging object, extended inward and then downward to form the base and then upward and outward and again inward to form the resilient means, which provides the over-the-center clamping and the holding of the base against the post.

Cams are provided on the attachment means on a side of the post opposite the base to adjust the resilient force with which the base is held against the post and to provide versatility so that the device may be used with posts of different thicknesses.

A detachable cantilever apparatus for hanging objects at a distance from vertical posts has a cantilever with a substantially vertical base for lying against a vertical post. Resilient means extend outward from the base beneath the cantilever. First attachment means are connected to the resilient means remote from the base for cooperating with complementary second attachment means to connect the base and the cantilever to the vertical post. The resilient means urges the first attachment means outward away from the post. Second complementary attachment means, separable from the first attachment means, connects thereto with a portion of the second complementary attachment means positioned on an opposite side of the post. That attachment means captures and holds the base against the post.

In a preferred embodiment the base is vertically elongated and the attachment means is positioned opposite a portion of the base. Preferably the attachment means is positioned opposite an upper portion of the base. The base extends upward above the attachment means.

In a preferred embodiment the first attachment means is a bar extending preferably to the post in a plane generally parallel with the post. The second complementary attachment means is a U shaped element having a central portion for engaging a post on a side thereof opposite the base and having two spaced side sections connected at first ends thereof to the central section and having hooked sections connected to the second ends of the side sections. The hooked sections are configured for hooking and capturing the bar.

In one preferred embodiment a cam is connected to the central section of the second complementary attachment means, so that the central section may be spaced at varied positions from the post by the cam. Preferably the cam is a block having an opening extending therethrough for receiving the central portion. The opening is positioned in the block at unique spacings from sides thereof. The blocks may be turned on the central section, and a selected side of the block may be rested against a post, whereby a unique distance between the post and the central station of the second attachement means is selected.

In one embodiment the cam is a cylindrical body having a generally horizontal axis. An opening is placed through the cylindrical body offset from its axis and parallel thereto. The opening receives the central portion. A lever connected to the cylindrical body is used to turn the body to pull the opening and the central section of the second attachment means away from the post on which the cylindrical surface rests.

In one embodiment the first attachment means has hooks extending from the resilient means beyond the base, and the second attachment means is a pin having a central portion for mounting on a side of the vertical post opposite the base and having end portions extending from the central portion for receiving the hooks of the first attachment means.

In one embodiment the resilient means has a portion which extends outward from a lower portion of the base. A portion extends inward from an outermost extension of the outward extending portion, and the first attachment means is connected to that inward extending portion of the resilient means.

In one embodiment the inward extending portion of the resilient means has a loop formed at the innermost end thereof. A hook has a first end portion for attachment to the loop and a second end portion for positioning on a side of the post opposite the base.

In another embodiment parallel hooks extend from the inward extending portion of the resilient means beyond the base. A pin is positioned on a side of the post opposite the base for receiving the hooks.

In another embodiment the inward portion is formed with a loop, and a U-shaped element has a central portion for positioning the loop. Side portions have hooks at distal ends thereof. A pin for positioning on a side of the post opposite the base has ends for receiving the hooks.

In a preferred embodiment the cantilever, base and resilient means are formed of a strip material. A hook on a distal end of a cantilever receives an object to be hung from the cantilever. The cantilever extends inward and is integrally joined with the base. The base extends generally downward. The resilient means is integrally joined with a lower portion of the base, and extends outward therefrom toward the distal end of the cantilever. The resilient means has a portion extending inward from an outward extension of the outward extending portion. The inward extending portion holds the first attachment means at a position thereon opposite the base. The cantilever is raised, angling the base outward from the post before connecting the first and second attachment means. After the first and second attachment means are connected, the cantilever is rocked downward around the first and second attachment means, which compresses the resilient means with an over-the-center locking arrangement with the base positioned against the post.

In one form of the invention, a clamping force may be provided by a curvilinear camming surface which may be adjusted and which may be used with or without the resilient means.

In the preferred form of the invention to resilient means is used in connection with the clamping. The resilient means can be provided on any part of the apparatus—on the cantilever assembly, on the attachment means, or between the attachment means and a side of the post opposite the cantilever assembly, for example.

In the preferred embodiment, the resilient means is a part of the cantilever assembly. The resilient means can be a spring such as a helical compression spring, or one or more tension springs, or maybe a bent or coiled material. In the preferred embodiment, the resilient means is an integral part of the cantilever assembly. The resilient means may be used to force the base against the post with sufficient normal force to provide a frictional force which is greater than the sliding force created by the combined weights of the suspended object and the cantilever assembly. Such a normal force may be provided with or without over-the-center clamping. In the preferred embodiment, over-the-center clamping is provided.

The present invention is effective whether or not an increase in suspended weight tends to increase a normal force of a base against the post. In the preferred embodiment, the attachment means is positioned such that the weight supported on a distal end of the cantilever assembly tends to increase the normal force of the base against the post or at least tends to increase a normal force of a lower portion of the base against the post, resulting in increased frictional stability.

These and other and further objects and features of the invention will be apparent in the disclosure which includes the foregoing and ongoing description, with the claims, and the drawings.

BRIEF DESCRIPTION OF THE DRAWINGS

FIG. 1 is a perspective view of the cantilever assembly mounted on a vertical post.

FIG. 2 is an elevational detail of steps in mounting the cantilever assembly on a post.

FIG. 3 is an elevational detail of a cam block and hooks.

FIG. 4 is a detail of a different position of the cam block shown in FIG. 3.

FIG. 5 is a plan of the cam block and hooks shown in FIGS. 3 and 4.

FIG. 6 is a detail of an alternate embodiment.

FIG. 7 is a detail of a third embodiment.

FIG. 8 is a detail of a forth embodiment showing use of a modified cam.

DETAILED DESCRIPTION OF THE DRAWINGS

Referring to the drawings, a cantilever attachment is generally indicated by the numeral 1. Post 2 of the square cross-section type normally associated with balcony railings 4 is seen in the drawing. The post usually is mounted in a reinforced poured concrete balcony such as shown in the drawings by the numeral 6.

A cantilever assembly generally indicated by the numeral 10, has a cantilever member 12 with a hook 14 formed by curving upward the distal end 16 of the cantilever member 12. An inner end 18 of the cantilever member is curved downward to integrally form a base 20. Base 20 has an upper end 22 which is integrally connected to inner end 18 of the cantilever member 12. Preferably, the interconnection between the upper end 22 of the base and the inner end 18 of the cantilever member 12 forms a radius with a curved outer surface 26. The base 20 is generally configured for resting vertically against vertical post 2. Lower end 28 of base 20 is curved outward to form a resilient means 30. The resilient means 30 has an outward extending portion 32 with an inward end 34 which joins lower end 28 of base 20 in a smooth curve. The outward end 36 of the outward extending portion 32 has a curve 38 which leads to the inward extending portion 40. The inward extending portion 40 of the resilient member 30 has an outer end 42 connected in a smooth curve with the outer end 36 of the outward extending portion 32 of the resilient member 30. An inner end 44 of the inward extending portion 40 is spaced from the inside surface of base 20. Inward extending portion 40 underlies the cantilever 12 and provides reinforcement support to the cantilever when a weight is suspended on the distal hook 14.

An attachment means is generally indicated by the numeral 50. The attachment means has a first part attached to the cantilever assembly 10. In this case, the first part 52 is a pin which has a central portion connected such as by welding to an underside of the inward extending member 40 at a position near its inner end 44. Opposite ends of pin 52 extend beyond the member 40 so that the second attachment means 54 may be connected to the pin. The second attachment means 54 is constructed in a U-shape with a central portion 56 configured for positioning on a side of the post 2 opposite base 20. Side portions 58 of the second attachment means 54 extend toward the first attachment means and terminate in hook portions 60 which engage end portions 52.

As shown in the drawings, for installation the second attachment means 54 is positioned around the post 2. The cantilever assembly 10 is tilted upward on the hooks 60. The curved outer surface 26 intermediate the inner end 18 of cantilever 12 and the upper end 22 of a base member 20 is against the side of post 2. The cantilever assembly 10 is rotated downward, compressing resilient member 30. As the cantilever assembly 10 continues downward, pin 52 in its downward movement passes through horizontal alignment with curved surface 26 which is the fulcrum of the turning at a point of maximum compression of the resilient member 30. Continued downward movement of the cantilever assembly 10 permits the curved surface 26 to move upward, slightly relaxing the compression of the resilient member 30. At the position shown in the drawing, pin 52 is below the fulcrum 26, with base 20 resting squarely against post 2. Thus, over-the-center clamping has been effected.

A weight suspended from hook 14 on the distal end of cantilever 12 tends to bring cantilever member 12 into contact with parallel inward extending member 40 which provides support to the cantilever member 12. Weight suspended from hook 14 tends to pivot around fixed point 52 increasing the normal force on base 20, providing increased frictional force to resist downward sliding of the cantilever assembly 10 on post 2.

As shown in the drawings, a camming means 70 may be provided for the attachment means 50. Specifically, camming means 70 is attached to the central portion 56 of the second attachment means 54. The camming means 70 receives the central portion 56 in an opening 72 which is offset from an axis 74. The opening 72 is spaced different distances from sides 76, 78, 80 and 82 so that any one of the four distances may be selected to provide the desired spacing of central section 56 from the side of post 2 opposite the cantilever assembly. The particular face of the camming member 70 which abuts the post 2 is selected to provide desired compression in the resilient means 30 when the cantilever assembly is connected to the hooks 60.

A modified form of the invention is formed by reentrantly bending the inner end 44 of inward extending portion 40 to form a loop 46 which becomes the first attachment means. The second attachment means 84 has a central portion 86 for positioning on a side of post 2 opposite base 20 of cantilever assembly 10a. An inner end 88 of the second attachment means is positioned in loop 46 to secure the cantilever assembly 10a to post 2.

In the mounting procedures for cantilever assembly 10a, the cantilever assembly is tipped upward, bringing loop 46 in closer proximity to the post. The central portion 86 of the second attachment means 84 is placed against the side of the post 2 opposite the cantilever assembly, and the cantilever assembly 10a is slid laterally through gap 89. With loop 46 firmly captured in the hook 88, assembly 10a is rotated downward, compressing resilient means 30 until base 20 rests against post 2 and an over-the-center clamp has been effected. Cam means such as 70 may be mounted on the central portion 86 of the second attachment means 84.

Modified cantilever assembly 10c has a first attachment means formed as a hook assembly 54'. Hooks 60' engage extended ends of pin 52' which is mounted in a cam 90.

Cantilever assembly 10c has a modified resilient portion 30'. Inward extending portion 40' has an upward turned loop 46' which receives a central section 56' of a first attachment means 54'. The second attachment means comprises a pin 52' mounted in a cam member 90 with a curved outer face. Pin 52' is mounted in opening 92 which is offset from axis 94 of the camming member 90. Handle 98 turns the camming member 90 so that a selected portion of the cylindrical face 96 of cam 90 rests against a surface of post 2 opposite base 20' and lower end 28' of the base 20' of cantilever assembly 10c.

It will be appreciated that the cam 90 may be used with any one of the second attachment assemblies shown in the drawings.

It will be appreciated that while the present invention is particularly useful in hanging objects from posts associated with railings and balconies and steps, the cantilever assembly and attachment means have many uses. Specifically, the cantilever assemblies of the present invention snap quickly onto vertical posts. No preparation of the posts is required. The invention needs no drilling and needs no bolts or screws or tools of any kind. The invention can be attached and removed in seconds. It may be adjusted at any level and snapped into place. The cantilever assembly holds firmly and will not slide or move once in place. One embodiment of the invention made of durable steel holds up to 45 pounds and up to a 14 inch pot. The invention may be used with posts of any shape and is particularly suitable for posts of square cross-sections having transverse dimensions of from about $\frac{1}{2}$ to about $\frac{3}{4}$ of an inch or having other dimensions.

While the invention has been described with reference to specific embodiments, modifications and variations of the invention may be constructed without departing from the scope of the invention. The scope of the invention is defined in the following claims.

I claim:

1. Detachable cantilever apparatus for hanging objects at a distance from vertical posts comprising a cantilever having a substantially vertical base for lying against a vertical post, resilient means extending outward from the base beneath the cantilever, first attachment means connected to the resilient means remote from the base for cooperating with complementary second attachment means to connect the base and the cantilever to the vertical post, the resilient means urging the first attachment means outward away from the post, and second complementary attachment means, separable from the first attachment means and connectable thereto with a portion of the second complementary attachment means positioned on an opposite side of the post for cooperating with the first attachment means to capture and hold the base against the post.

2. The apparatus of claim 1 wherein the base is vertically elongated and the first attachment means is positioned opposite a portion of the base.

3. The apparatus of claim 2 wherein the first attachment means is positioned opposite an upper portion of the base.

4. The apparatus of claim 3 wherein the base extends upward above the attachment means.

5. The apparatus of claim 4 wherein the first attachment means comprise a base extending perpendicularly to the post in a plane generally parallel with the post and wherein the second complementary attachment means comprises a U-shaped element having a central portion for engaging a post on a side thereof opposite the base and having two spaced side sections connected at first ends thereof to the central section and having hooked sections connected to the second ends of the side sections, the hooked sections configured for hooking and capturing the bar.

6. The apparatus of claim 5 further comprising cam means connected to the central section of the second complementary attachment means whereby the central section may be spaced at varied positions from the post by the cam means.

7. The apparatus of claim 6 wherein the cam means comprises a block having an opening extending therethrough for receiving the central portion and wherein the opening is positioned in the block at unique spacings from sides thereof, whereby the block may be turned on the central section and a selected side of the block may be rested against a post whereby a selected distance between the post and the central section of the second attachment means is selected.

8. The apparatus of claim 6 wherein the cam means comprises a cylindrical body having a generally horizontal axis and wherein an opening is placed through the cylindrical body offset from its axis and parallel thereto and wherein the opening receives the central portion of the second attachment means and further comprising a lever connected to the cylindrical body whereby the lever may be used to turn the body to pull the opening and the central section of the second attachment means away from the post on which the cylindrical surface rests.

9. The apparatus of claim 5 wherein the first attachment means comprises hooks extending from the resilient means beyond the base and wherein the second attachment means comprises a pin having a central portion for mounting on a side of the vertical post opposite the base and having end portions extending from the central portion for receiving the hooks of the first attachment means.

10. The apparatus of claim 9 further comprising cam means connected to the central section of the second complementary attachment means whereby the central section may be spaced at varied positions from the post by the cam means.

11. The apparatus of claim 10 wherein the cam means comprises a block having an opening extending therethrough for receiving the central portion and wherein the opening is positioned in the block at unique spacings from sides thereof, whereby the block may be turned on the central section and a selected side of the block may be rested against a post whereby a selected distance between the post and the central section of the second attachment means is selected.

12. The apparatus of claim 10 wherein the cam means comprises a cylindrical body having a generally horizonal axis and wherein an opening is placed through the cylindrical body offset from the axis and parallel thereto and wherein the opening receives the central portion of the second attachment means and further comprising a lever connected to the cylindrical body whereby the lever may be used to turn the body to pull the opening and the central section of the second attachment means away from the post on which the cylindrical surface rests.

13. The apparatus of claim 5 wherein the resilient means has a portion which extends outward from a lower portion of the base, wherein the resilient means includes a portion which extends inward from an outermost extention of the outward extending portion and wherein the first attachment means is connected to the inward extending portion of the resilient means.

14. The apparatus of claim 13 wherein the first attachment means comprises a pin having end portions thereof extending from the second portion of the resilient means and wherein the second attachment means comprises a U-shaped element having a central portion for positioning on a side of the post opposite the base and having hooked shaped terminal for receiving ends of the pin.

15. The apparatus of claim 13 wherein the inward extending portion of the resilient means has a loop formed at the innermost end thereof and wherein the first and second attachment means comprise a hook having a first end portion for attachment to the loop and having a second end portion for positioning on a side of the post opposite the base.

16. The apparatus of claim 13 wherein the first attachment means comprises parallel hooks extending from the inward extending portion of the resilient means beyond the base and wherein the second attachment means comprises a pin for positioning on a side of the post opposite the base and for receiving the hooks of the first attachment means.

17. The apparatus of claim 13 wherein the inward portion is formed with a loop and wherein the first attachment means comprises a U-shaped element with a central portion for positioning in the loop and with side portions having hooks at distal ends thereof and wherein the second attachment means comprises a pin for positioning on a side of the post opposite the base and having ends for receiving the hooks of the first attachment means.

18. The apparatus of claim 1 wherein the cantilever, base and resilient means are formed of a strip material and begins with a hook on a distal end of a cantilever means for receiving an object to be hung from the cantilever means, the cantilever means extending inward and being integrally joined with the base, the base extending generally downward, and the resilient means integrally joined with a lower portion of the base and extending outward therefrom toward the distal end of the cantilever means, and the resilient means having an inward extending portion extending inward from an outward extention of the outward extending portion, and the inward extending portion holding the first attachment means at a position thereon opposite the base, whereby the cantilever may be raised, angling the base outward from the post before connecting the first and second attachment means and whereby after the first and second attachment means are connected, the cantilever may be rocked downward around the first and second attachment means which compresses the resilient means with an over-the-center locking arrangement with the base positioned against the post.

19. The apparatus of claim 18 further comprising cam means connected to the second attachment means whereby the cam means is used to selectively space a portion of the second attachment means from a side of the post opposite the base.

20. The apparatus of claim 19 wherein the cam means has an opening for receiving the portion of the second attachment means, and wherein the opening is offset from an axis of the cam means.

21. The method of attaching a cantilever to a vertical post comprising tipping a cantilever assembly upward and hooking a first attachment means on the cantilever to a second attachment means having at least a portion thereof on a side of a vertical post opposite the cantilever, rotating the cantilever assembly downward and compressing a resilient means on the cantilever assembly, moving the cantilever assembly slightly upward on the post and slightly decompressing the resilient means, resting a base of the cantilever assembly against the post, with the attachment means connected to the cantilever assembly in a position opposite an intermediate position of the cantilever between upper and lower extremities thereof, thus effecting an over-the-center locking arrangement of the cantilever assembly with the post.

22. The method of claim 21 further comprising adjusting a cam connected to the attachment means on a side of the post opposite the base for adjusting effective length of the attachment means and thereby adjusting effective compression of the resilient means.

* * * * *